(12) United States Patent
Buher

(10) Patent No.: US 6,688,835 B1
(45) Date of Patent: Feb. 10, 2004

(54) SIDE RAMP ASSEMBLY FOR A TRAILER

(75) Inventor: Robert Buher, Kent, WA (US)

(73) Assignee: James W. DeCaro, Renton, WA (US)

( * ) Notice: Subject to any disclaimer, the term of this patent is extended or adjusted under 35 U.S.C. 154(b) by 0 days.

(21) Appl. No.: 09/915,493

(22) Filed: Jul. 25, 2001

(51) Int. Cl.$^7$ ................................................. B60P 1/00
(52) U.S. Cl. ..................... 414/537; 296/162; 414/558; 414/921
(58) Field of Search ................................. 14/71.3, 69.5, 14/71.1; 414/558, 921, 537, 538, 522; 296/162

(56) References Cited

U.S. PATENT DOCUMENTS

| | | |
|---|---|---|
| 2,457,380 A | 12/1948 | Kelberer |
| 2,606,786 A * | 8/1952 | Howard ................... 414/537 X |
| 3,168,959 A | 2/1965 | Chandler et al. |
| 3,743,121 A | 7/1973 | Langer |
| 4,347,638 A * | 9/1982 | Weaver ....................... 14/71.1 |
| 4,624,619 A | 11/1986 | Uher |
| 4,828,449 A | 5/1989 | Traylor |
| 4,869,030 A * | 9/1989 | Clark ..................... 296/162 X |
| 4,878,800 A | 11/1989 | Dell |
| 4,950,124 A | 8/1990 | Burghart et al. |
| 5,026,243 A | 6/1991 | Dell |
| 5,133,584 A | 7/1992 | McCleary |
| 5,799,962 A * | 9/1998 | Barnhart ...................... 280/166 |
| 5,832,555 A | 11/1998 | Saucier et al. |

OTHER PUBLICATIONS

Food Distribution, "How the Folding Ramp Works," romcorp.com, http://www.romcorp.com/food5b.htm [retrieved Jan. 10, 2001].
Food Distribution, "Roadwarrior SidekicK Folding Safety Walkramp," romcorp.com, http://www.romcorp.com/food5b.htm [retrieved Jan. 10, 2001].

* cited by examiner

Primary Examiner—Richard Ridley
(74) Attorney, Agent, or Firm—Black Lowe & Graham PLLC

(57) ABSTRACT

A combination trailer and ramp assembly (20) is provided. The combination trailer and ramp assembly includes a trailer (24) having a floor assembly (30) including an upper surface, a lower surface, and a length. The trailer further includes first and second sidewalls (32) extending from the floor assembly, and a side door (34) located in at least one of the first and second sidewalls. The combination trailer and ramp assembly further includes a ramp assembly (26) slidably disposed on the lower surface of the trailer for reciprocating movements between a stowed position, where the ramp assembly is stowed underneath the floor assembly, and a deployed position, where the ramp assembly extends along an axis substantially parallel to the length of the floor assembly to permit access to the side door of the trailer.

34 Claims, 7 Drawing Sheets

SIDE RAMP ASSEMBLY FOR A TRAILER

FIELD OF THE INVENTION

The present application relates generally to loading ramps for vehicles and, more particularly, to a side-mounted ramp for a trailer.

BACKGROUND OF THE INVENTION

Both long and short-haul vans and semi-trucks are frequently required to make a delivery in narrow alleyways between buildings. For reasons of economics, it is often advantageous for these vehicles to carry both dry bulk goods, which are not required to be refrigerated, and perishables which, on the other hand, require at least some degree of refrigeration. To accommodate these deliveries, it is well known to use a dual temperature trailer having, as the name suggests, two temperature independent sections. One section of such trailers, typically the forward section, is refrigerated, while the other is not. For thermal efficiency, as well as practical considerations, such trailers have a side door providing access into the refrigerated compartment of the trailer.

To gain access into the side door, dual temperature trailers may include a variety of assemblies, such as a ladder located beneath the side door or a ramp that extends normal to the length of the trailer. Although such apparatuses are effective at providing access into and out of the trailer, they are not without their problems.

First, with trailers that utilize a ladder to gain access into and out of the trailer, the ladder often provides more of a hindrance to the efficient loading and unloading of the trailer. Specifically, in order to unload or load the trailer, the goods must be placed on the trailer bed while the delivery person climbs into or out of the trailer on the ladder. Although the delivery person may attempt to gain access into and out of the trailer by carrying the goods on their shoulder while climbing up and down the ladder, such an attempt is undesirable due to the inherent safety risks.

With respect to trailers that include a ramp extending normally to the length of the trailer, such systems are ineffective in numerous respects. In this regard, such trailers require a fairly large amount of space to extend the ramp at an appropriate angle which would make access into and out of the trailer on the ramp feasible. Further, in certain circumstances, maneuvering the trailer into an unloading area wide enough to accommodate the extension of such ramp assemblies is not possible. This is especially true in inner city deliveries where deliveries are often made in the narrow alleyways between buildings. Thus, for such deliveries, the ramp assembly is not extendable and, therefore, access into and out of the trailer is difficult at best.

Thus, there exists a need for a ramp assembly that provides access into and out of a side door of a trailer where the ramp assembly is lightweight and does not require a large area for extension.

SUMMARY OF THE INVENTION

One embodiment of the present invention includes a trailer and ramp assembly. The trailer includes a floor assembly having an upper surface, a lower surface, a length, and first and second sidewalls extending from the floor assembly. The trailer also includes a side door located in at least one of the first and second sidewalls. The ramp assembly is slidably disposed on the lower surface of the trailer for reciprocating movement between a stowed position, where the ramp assembly is stored underneath the floor assembly, and a deployed position, where the ramp assembly extends along an axis extending substantially parallel to the length of the floor assembly to permit access to the side door of the trailer.

In one aspect of this embodiment, the combination trailer and ramp assembly further includes a bracket assembly extending between the ramp assembly and the lower surface of the trailer. A portion of the bracket assembly is mounted to the lower surface of the trailer by a guide assembly for reciprocating movement of the ramp assembly between the stowed and deployed positions. In yet another aspect of this embodiment, the combination trailer and ramp assembly further includes a lock mechanism fastened to the bracket assembly for selectively locking the ramp assembly into the stowed position.

In still yet another embodiment of the present invention, the ramp assembly includes first and second platforms each having first and second-ends longitudinally spaced by a walking section having a length, and a hinge assembly. The hinge assembly extends between a portion of the bracket assembly and the second ends of the second platform at a support point for swinging movement of the second platform between a stored position, where the first and second platforms are stacked on each other, and an extended position, where the first end of the second platform is located on a ground surface.

In another embodiment of the present invention, the bracket assembly includes a retractable first support assembly positioned adjacent the support point and is selectively deployable into an extended position, wherein the retractable first support assembly is positioned for supporting engagement with the ramp assembly substantially near the support point.

In still yet another embodiment, the combination trailer and ramp assembly further includes a retractable second support assembly positioned substantially near the side door and is reciprocally coupled to the trailer for movement between an extended position, wherein the retractable second support assembly is positioned for supporting engagement with the second end of the first platform, and a retracted position. The retractable second support assembly includes a stationary support member fixed to a portion of the trailer and an arm telescopically received within a stationary support member. The arm is selectively deployable between an extended position, where the arm engages and supports the second end of the first platform, and a retracted position. When the arm is in the extended position, at least a portion of loads associated with the first platform is transferred to the stationary support member.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
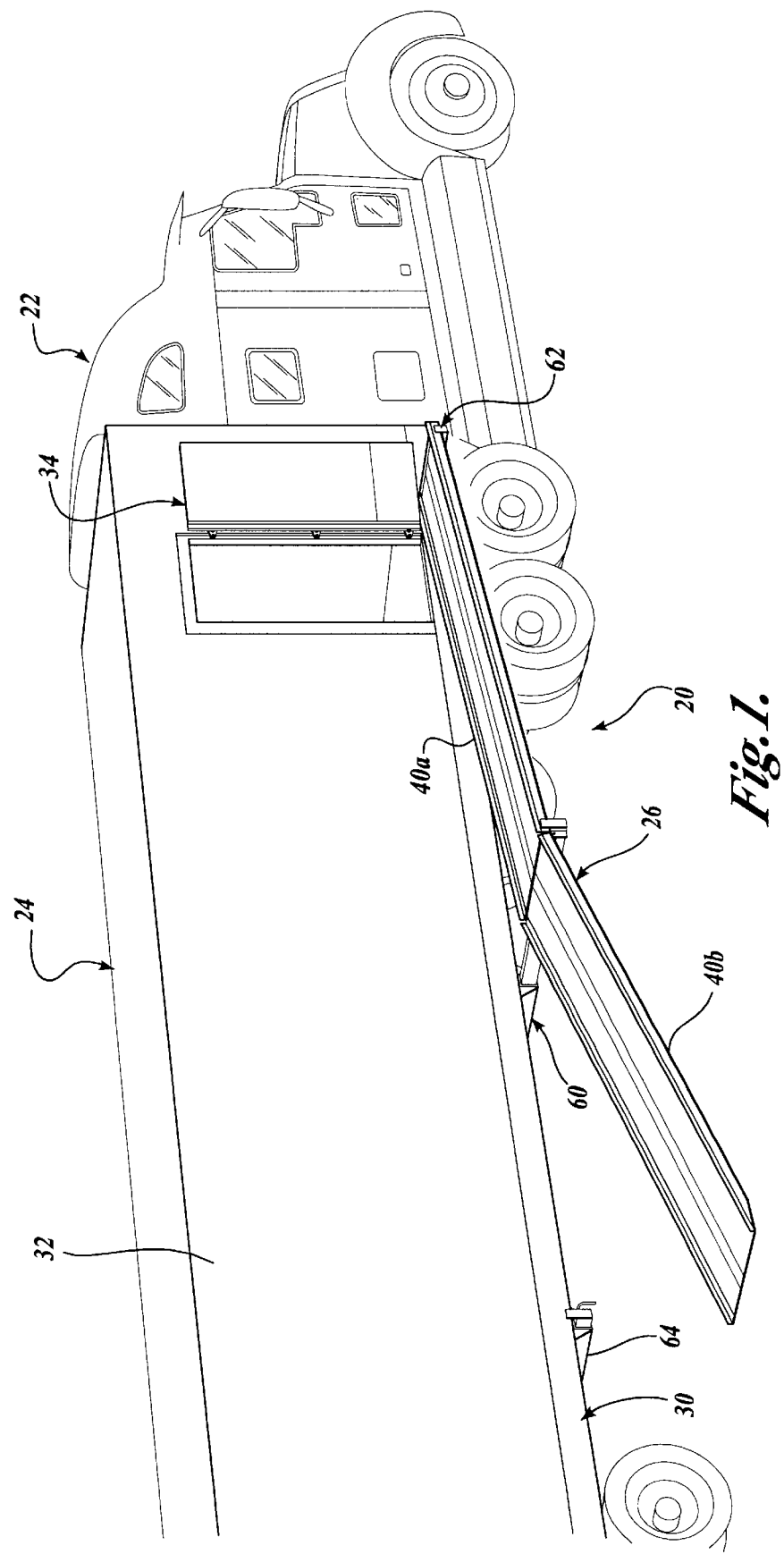
FIG. 1 is a perspective view of a combination trailer and side ramp assembly formed in accordance with one embodiment of the present invention.

FIG. 1 illustrates a combination trailer and ramp assembly 20 formed in accordance with one embodiment of the present invention. The combination trailer and ramp assembly 20 is illustrated as a semi-truck 22 and includes a trailer 24 and a ramp assembly 26. Although the combination trailer and ramp assembly 20 is illustrated as a semi-truck 22, the invention is not so limited. Accordingly, it should be apparent to one of ordinary skill that such a ramp assembly may be coupled to other types of vehicles, such as a delivery van, and therefore, such vehicles are also within the scope of the present invention.

The well-known trailer 24 includes a floor assembly 30, sidewalls 32 extending upwardly from the floor assembly 30, and a door 34 located in one of the sidewalls 32. Although not necessary, the trailer 24 is suitably a dual temperature trailer that includes at least two internal compartments (not shown) that are temperature independent of each other. Such trailers are known to transport both perishables that require refrigeration, as well as bulk goods that do not require refrigeration. Again, although such a trailer is preferred, other types of trailers, such as a full refrigerated trailer or a dry van, are also within the scope of the present invention.

As seen best by referring to FIGS. 1 and 2, the ramp assembly 26 will now be described in greater detail. The ramp assembly 26 includes first and second platforms 40a and 40b and a bracket assembly 42. Each platform 40a and 40b is identically configured and, therefore, only one platform will be described in greater detail. However, it should be apparent that the description of one platform is applicable to the other. The platform 40a may be suitably formed from a lightweight, high-strength material, such as aluminum. Each platform includes an elongated walking section 44, suitably formed from a grate-like material, longitudinally framed by first and second side rails 46a and 46b. The longitudinally spaced ends of the walking platform 44 define first and second ends 48a and 48b.

Opposing ends 48b and 48a of the first and second platforms 40a and 40b may be suitably attached by a well-known hinge assembly 50. In one embodiment, the hinge assembly 50 includes first and second attachment flanges 52a and 52b, first and second attachment arms 54a and 54b, and a shoulder flange 56. The first and second attachment flanges 52a and 52b are suitably formed on a portion of the bracket assembly 42, as described in greater detail below, and are positioned for pinned attachment to the first and second attachment arms 54a and 54b extending from the first end 48a of the second platform 40b.

Figure 2:
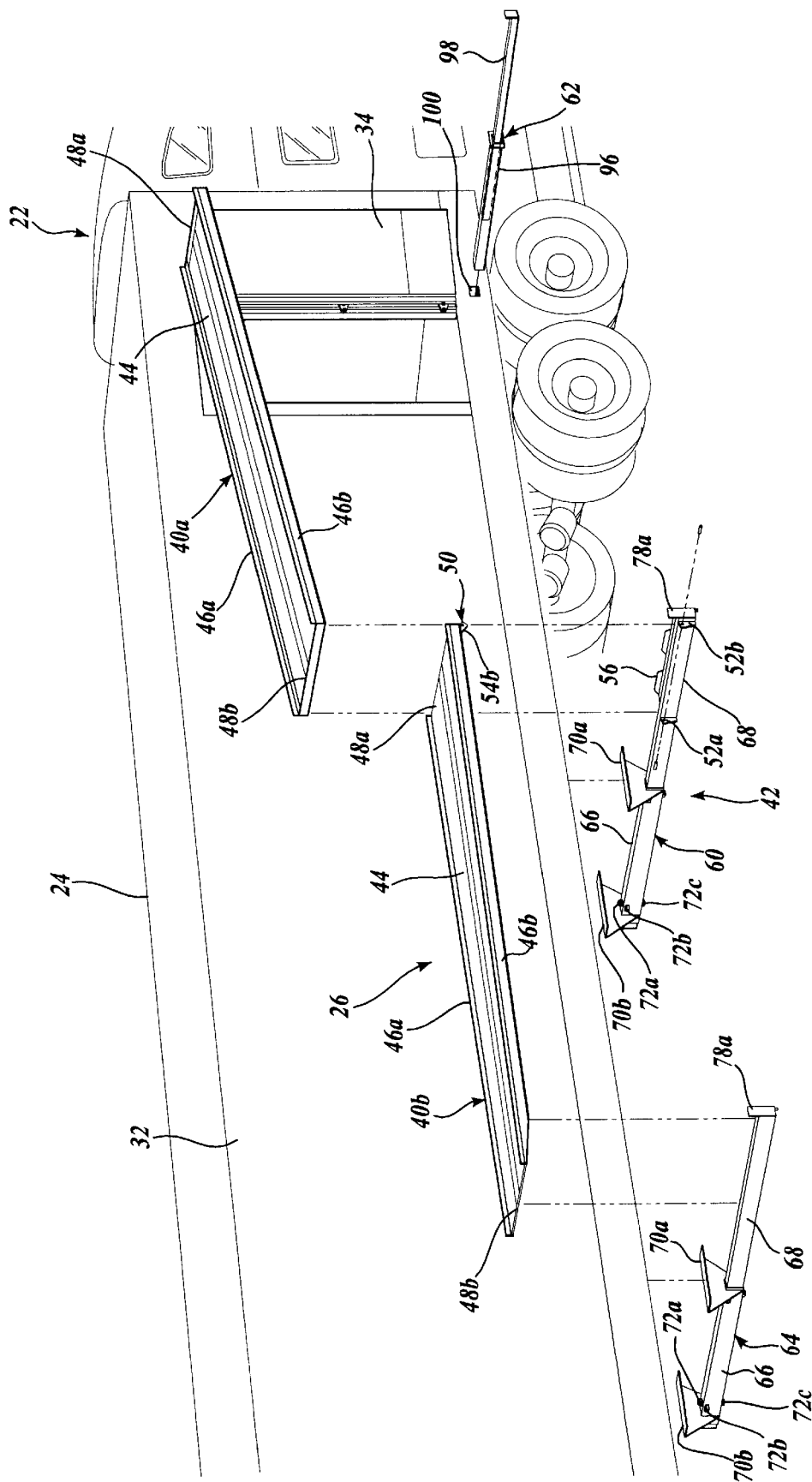
FIG. 2 is a partially exploded view of a combination trailer and side ramp assembly formed in accordance with one embodiment of the present invention showing the ramp assembly exploded away from the trailer for clarity.

For ease of illustration, only the second attachment arm 54b is illustrated in FIG. 2. However, it should be apparent that an identically configured attachment arm 54a is suitably positioned on the first end 48a of the second platform 40b. The shoulder flange 56 is suitably formed with a portion of the bracket assembly 42 and is positioned for arresting engagement with the second end 48b of the first platform 40a, as described in greater detail below.

Figure 3:
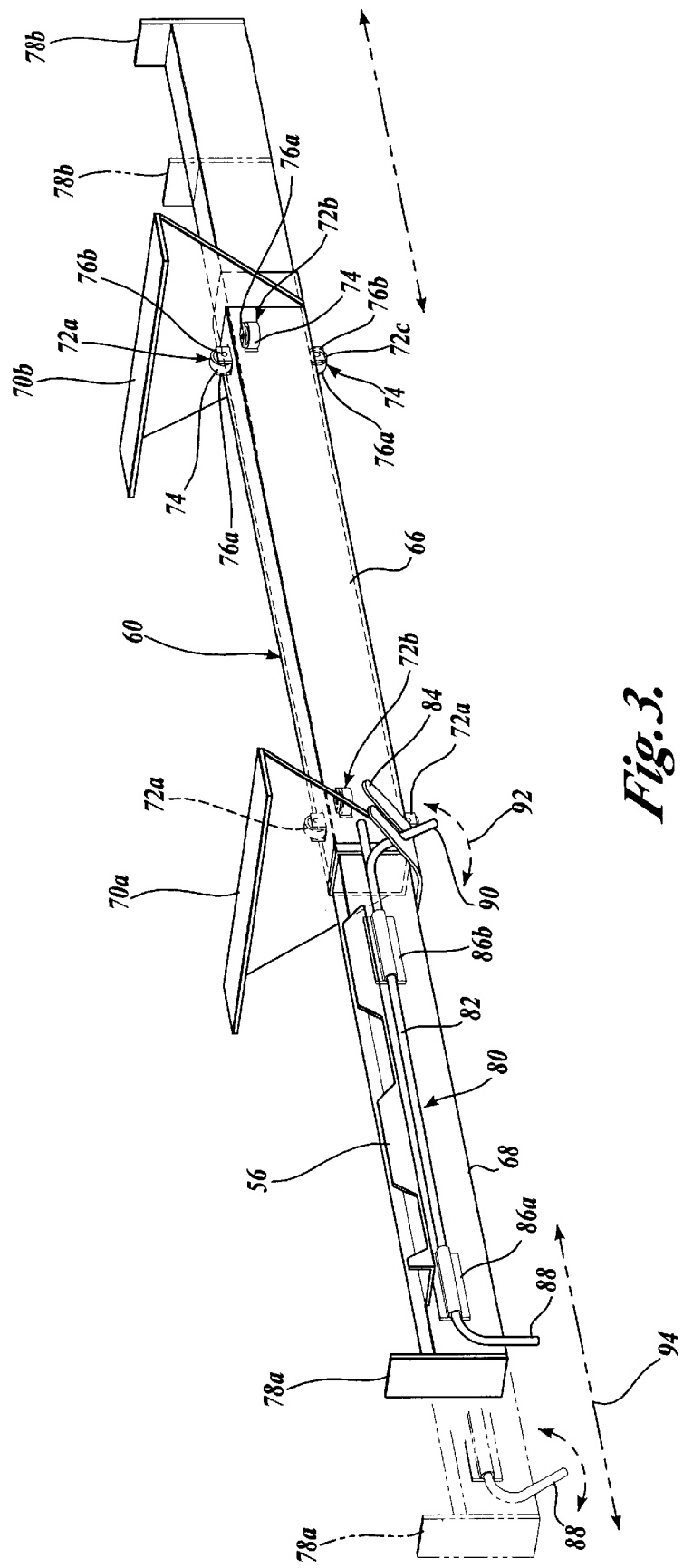
FIG. 3 is a perspective view of a portion of the ramp assembly formed in accordance with one embodiment of the present invention.

Referring now to FIGS. 2 and 3, the bracket assembly 42 will now be described in greater detail. The bracket assembly 42 includes first and second retractable support assemblies 60 and 62 and a stowage arm assembly 64. The first retractable support assembly 60 and stowage arm assembly 64 are substantially identically configured and, therefore, only the first retractable support assembly 60 will be described in greater detail. However, it should be apparent that the description of the first retractable support assembly 60 is applicable to the stowage arm assembly 64.

As may be seen best by referring to FIG. 3, the first retractable support assembly 60 is suitably formed from a high strength material, such as steel, and includes a housing 66 and an arm 68 slidably received within the housing 66. The housing 66 is suitably rectangular in configuration and is fastened to the floor assembly 30 of the trailer 24 by first and second flanges 70a and 70b. One end of each flange 70a and 70b is attached to the housing 66, while the other end of each flange 70a and 70b is suitably affixed to the floor assembly 30 in a manner well known in the art, such as by welding or rivets.

Attached to the housing 66 are a plurality of wheel guides 72a–72c. Each wheel guide 72a–72c includes a roller bearing 74 rotatably attached to the housing 66 by spaced parallel flanges 76a and 76b extending normally to a surface of the housing 66. The roller bearings 74 extend partially into the interior of the housing 66 through a correspondingly located hole extending through a side of the housing 66. The roller bearings 74 are positioned for sliding engagement with the arm 68 to assist in easy retraction and extension of the arm 68 from within the housing 66. The arm 68 is suitably rectangular in configuration and includes first and second stop flanges 78a and 78b attached to the longitudinal ends of the arm 68.

As may be best seen by referring to FIG. 3, the first retractable support assembly 60 also includes a lock assembly 80. The lock assembly 80 includes a lock arm 82 and a U-shaped detent 84. The lock arm 82 is rotatably attached to the arm 68 by a pair of brackets 86a and 86b. The lock arm 82 is suitably a rod-like member having one end curved in an L-shape manner to form a handle 88, while the other end of the lock arm 82 is similarly bent to form a lock bar 90.

The lock bar 90 is positioned on the arm 68 to be selectively received within the detent 84 to lock the first retractable support assembly 60 into a retracted position. In this regard, the first retractable support assembly 60 is illustrated in the retracted position, wherein the arm 68 is received within the housing 66 and stowed completely beneath the floor assembly 30 of the trailer 24. Further, the lock bar 90 of the lock assembly 80 is received within the U-shaped detent 84, thereby preventing unintentional deployment of the first retractable support assembly 60 during operation of the vehicle.

To unlock the arm 68 from within the housing 66, the operator would simply rotate the lock arm 82 in the direction indicated by the arrow 92 thereby removing the lock bar 90 from within the detent 84. The arm 68 is then slidably pulled out from within the housing 66 into an extended position and in the direction as indicated by the arrow 94. This position is illustrated in phantom in FIG. 3.

Figure 4:
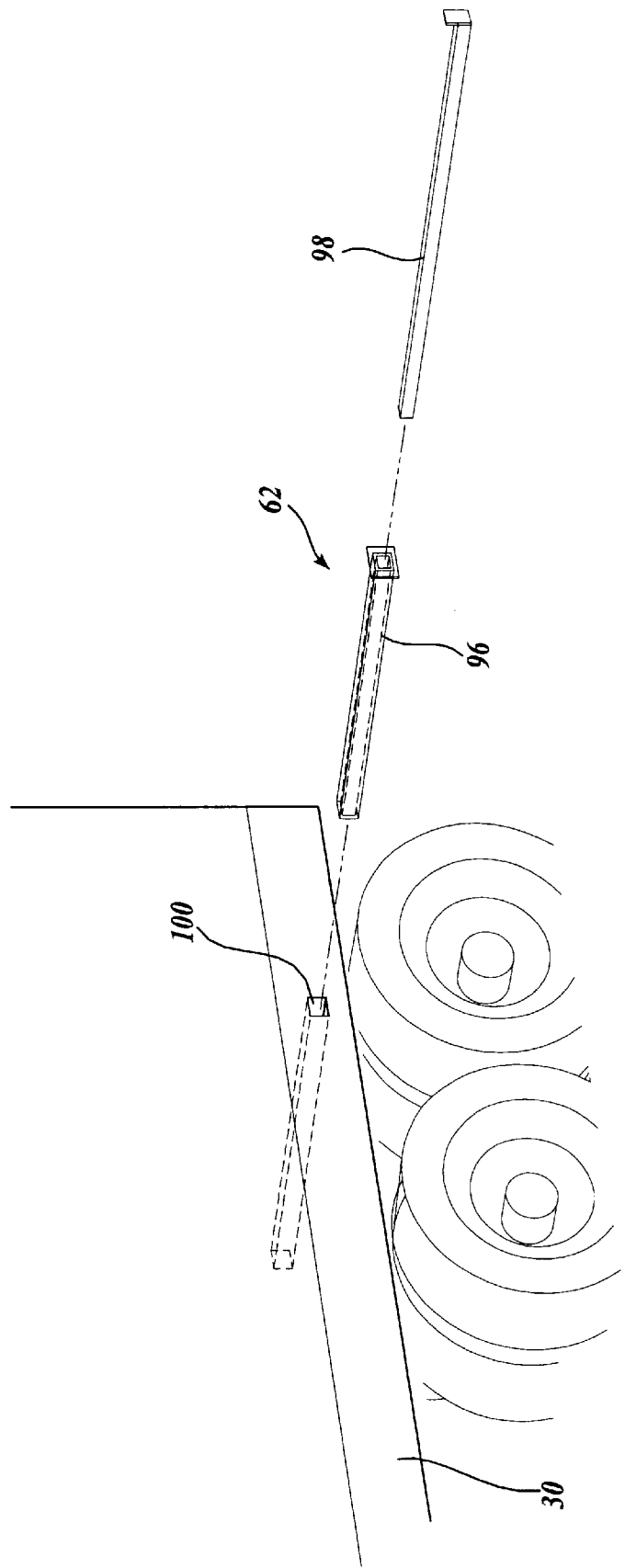
FIG. 4 is a partially exploded view of a portion of the bracket assembly of a combination trailer and side ramp assembly formed in accordance with one embodiment of the present invention.

Referring now to FIG. 4, the second retractable support assembly 62 will now be described in greater detail. The second retractable support assembly 62 is suitably formed from a high strength material, such as steel, and is disposed within the floor assembly 30 near the side door 34. The second retractable support assembly 62 includes a tubular housing 96 and a retractable arm 98. The tubular housing 96 is affixed within a cavity 100 extending normally to the longitudinal direction of the trailer 24.

The retractable arm 98 is slidably received within the housing 96 and may be reciprocated between a stowed position, where the arm 98 is received within the housing 96, and an extended position, wherein the arm 98 is pulled out from within the housing 96. In the extended position, the retractable arm 98 is simply supported by the housing 96, such that at least a portion of the load associated with the first platform 48 is transferred to the housing 96 and, therefore, to the floor assembly 30. The retractable arm 98 may be locked within the housing 96 by a latch plate (not shown) adapted to seal the arm 98 within the housing 96 when the second retractable support assembly 62 is in the stowed position.

Figure 5:
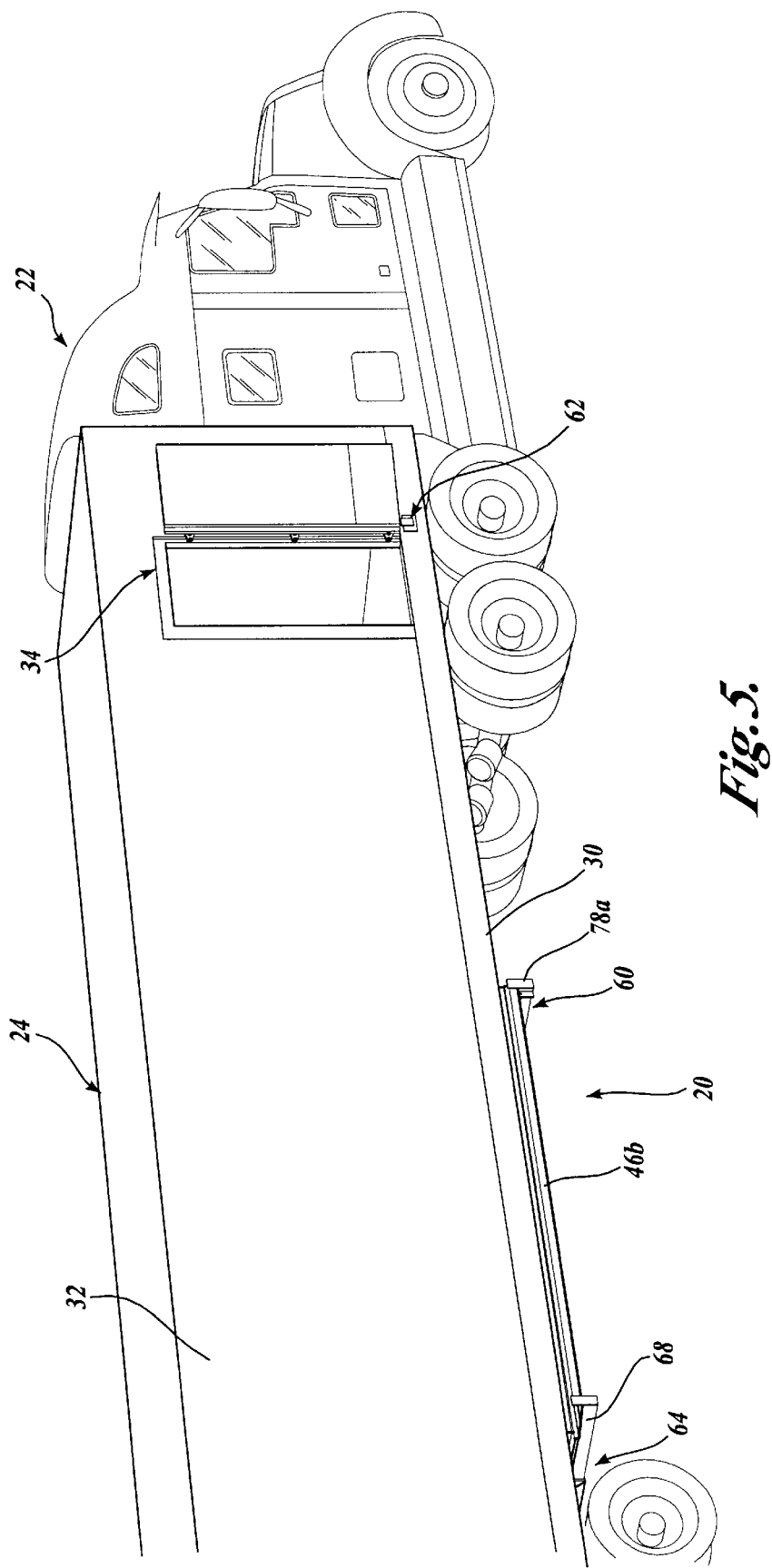
FIG. 5 is a perspective view of a combination trailer and side ramp assembly formed in accordance with one embodiment of the present invention and showing the side ramp assembly in a stowed position.
Figure 6:
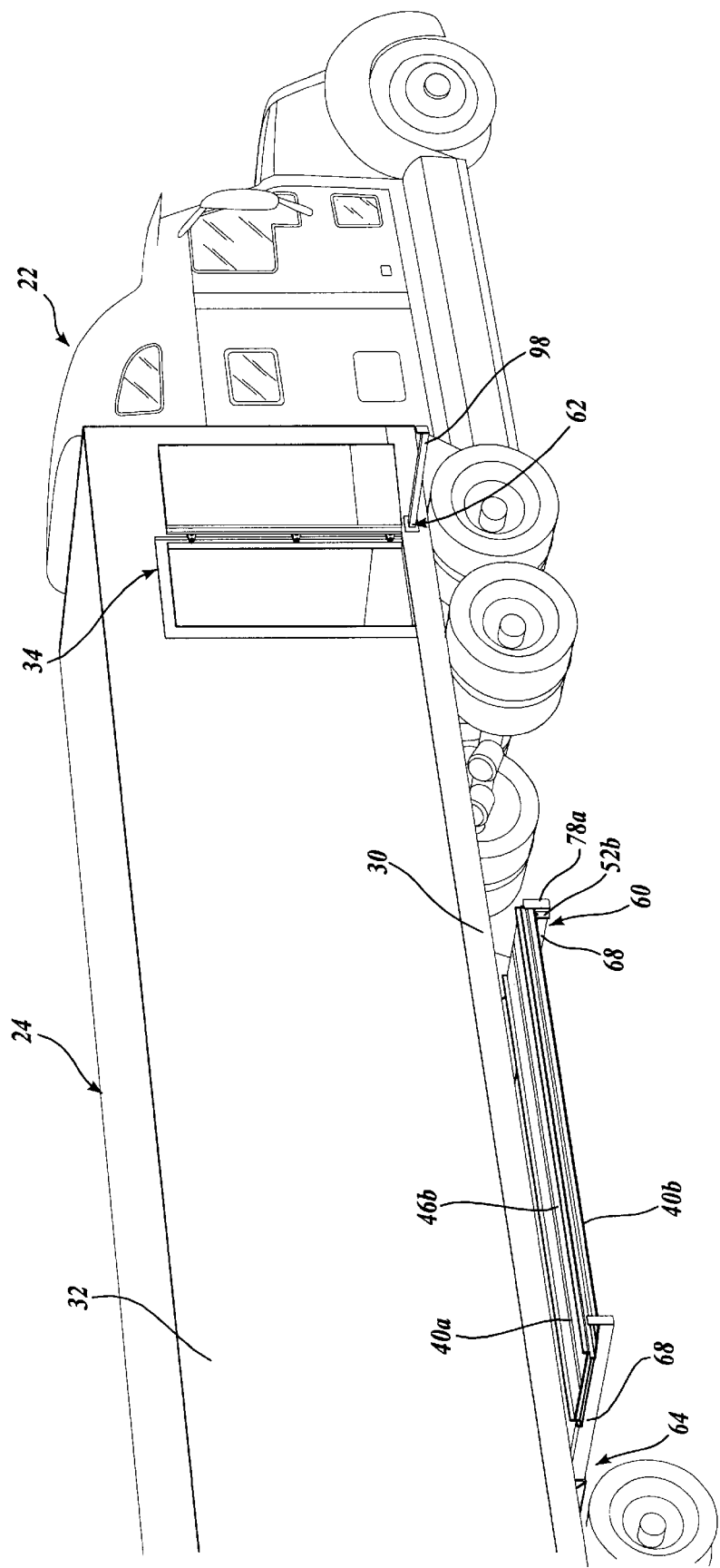
FIG. 6 is a perspective view of a combination trailer and side ramp assembly formed in accordance with one embodiment of the present invention and showing the ramp assembly in a folded but unstowed position.
Figure 7:
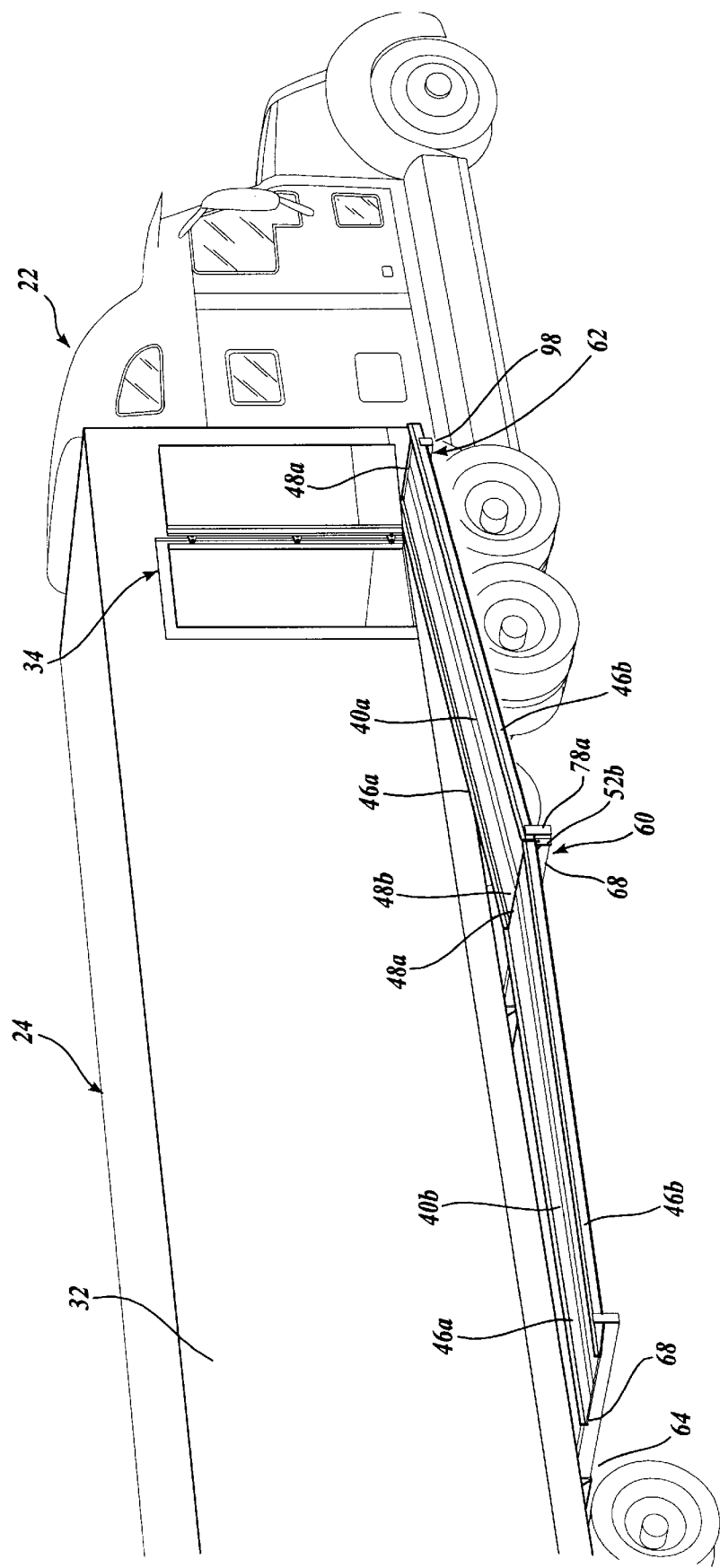
FIG. 7 is a perspective view of a combination trailer and side ramp assembly formed in accordance with one embodiment of the present invention and showing the side ramp assembly in a partially deployed position.

Operation of the combination trailer and ramp assembly 20 may be best understood by referring to FIGS. 5–7. As seen in FIG. 5, the ramp assembly 26 is in the stowed position and is disposed underneath the floor assembly 30 of the trailer 24. To deploy the ramp assembly 26, the operator extends the retractable arm 98 of the second retractable support assembly 62 located near the side door 34. Next, the operator unlocks the lock assembly 80 of the first retractable support assembly 60, as well as the lock assembly of the stowage arm assembly 64. Then, the operator grabs on to the side rails 46a of the ramp assembly 26 and pulls the ramp assembly 26 out from underneath the floor assembly 30 of the trailer 24. This position is illustrated in FIG. 6. Sliding motion of the ramp assembly 26 is facilitated by the roller bearings 74, as described above.

As seen best in FIG. 7, the first platform 40a is slid from the top of the second platform 40b until the first end 48a of the first platform 40a is received on and supported by the extended retractable arm 98 of the second retractable support assembly 62. The first platform 40a is pulled forward until the second end 48b engages the shoulder flange 56 positioned on the arm 68 of the first retractable support assembly 60. Next, the second end 48b of the second platform 40b is lifted upward and the arm 68 of the stowage arm assembly 64 is slid back into the housing 66. Finally, the second end 48b of the second platform 40b is lowered to the ground surface. In this position, the ramp assembly 26 extends in a direction parallel to the longitudinal direction of the trailer 24 and is simply supported by the ground surface, thereby allowing the ramp assembly to be deployable on both level and unlevel surfaces.

The combination trailer and side ramp assembly 20 formed in accordance with one embodiment of the present invention has several advantages over currently available assemblies. As a non-limiting example, because the ramp assembly extends parallel to the length of the trailer, such a vehicle does not require a large spotting area to load or unload the vehicle. This is especially advantageous for inner city deliveries. Further, there is no need for a level surface for the efficient operation of the ramp assembly because one end of the ramp assembly is adapted to be simply supported by the ground surface. Another example is time savings. This advantage is illustrated by the fact that the ramp assembly may be deployed and stowed in a matter of seconds. This has freed up time available for backhauling of product, reduced overtime, and improved on-time delivery. Also, because the ramp assembly is easy to deploy, as well as stow, the operator will tend to use it instead of by-passing the ramp and transferring goods by lifting them into and out of the trailer. This reduces the risk of injury, as well as reduces the risk of damaged goods. Thus, such a combination has multiple advantages over existing systems.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A ramp assembly for a trailer, the a trailer having a floor assembly including an upper surface, a lower surface, and a length, the trailer further including first and second sidewalls extending from the floor assembly and a side door located in at least one of the first and second sidewalls, the ramp assembly comprising:

a ramp slidably disposed on the lower surface of the floor assembly for reciprocating movement between a stowed position aft of the side door, where the ramp is stored underneath the floor assembly, and a deployed position, where the ramp extends alongside the trailer from a ground surface toward the side door along an axis substantially parallel to the length of the floor assembly to permit access to the side door of the trailer; and a bracket assembly configured to support the ramp thereon and extending between the ramp and the lower surface of the floor assembly.

2. The ramp assembly of claim 1, wherein a portion of the bracket assembly is mounted to the lower surface of the floor assembly by a guide assembly for reciprocating movement of the ramp assembly between the stowed and deployed positions.

3. The ramp assembly of claim 2, wherein the guide assembly includes a roller assembly to assist in the reciprocating movement of the ramp.

4. The ramp assembly of claim 2, further comprising a lock mechanism fastened to the bracket assembly for selectively locking the ramp in the stowed position.

5. The ramp assembly of claim 4, wherein the ramp assembly further comprises:

first and second platforms each having first and second ends longitudinally spaced by a walking section having a length; and a hinge assembly extending between a portion of the bracket assembly and the second end of the second platform at a support point for swinging movement of the second platform between a stored position, where the first and second platforms are stacked on each other, and an extended position, where the first end of the second platform is located on the ground surface.

6. The ramp assembly of claim 5, wherein the bracket assembly includes a retractable first support assembly positioned adjacent the support point, the retractable first support assembly selectively deployable into an extended position, wherein the retractable first support assembly is positioned for supporting engagement with the ramp assembly substantially near the support point.

7. The ramp assembly of claim 6, further comprising a retractable second support assembly positioned substantially near the side door, the retractable second support assembly being reciprocally coupled to the trailer for movement between an extended position, wherein the retractable second support assembly is positioned for supporting engagement with the second end of the first platform, and a retracted positioned.

8. The ramp assembly of claim 7, wherein the retractable second support assembly includes a stationary support member fixed to a portion of the trailer and an arm telescopically received within the stationary support member, the arm being selectively deployable between extended position, where the arm engages and supports the second end of the first platform, and a retracted position.

9. The ramp assembly of claim 8, wherein when the arm is in the extended position, at least a portion of loads associated with the first platform is transferred to the stationary support member.

10. A ramp assembly for a trailer, the trailer having a floor assembly including an upper surface, a lower surface, and a length, the trailer further including first and second sidewalls extending from the floor assembly and a side door located in at least one of the first and second sidewalls, the ramp assembly comprising:
   a ramp slidably disposed on the lower surface of the floor assembly for reciprocating movement between a stowed position aft of the side door, where the ramp is stored underneath the floor assembly, and a deployed position, where the ramp extends alongside the trailer from a ground surface toward the side door along an axis substantially parallel to the length of the floor assembly to permit access to the side door of the trailer, wherein the ramp includes first and second platforms each having first and second ends longitudinally spaced by a walking section having a length; and
   a brace assembly configured to support the ramp thereon and extending between the lower surface of the floor assembly and the ramp, the brace assembly being slidably coupled to the floor assembly for reciprocating movement of the ramp between the stowed and deployed positions.

11. The ramp assembly of claim 10, further comprising a locking device coupled to the brace assembly to selectively prevent the ramp from moving from the stowed position to the deployed position.

12. The ramp assembly of claim 10, wherein the brace assembly further includes a roller assembly to assist in the reciprocating movement of the ramp.

13. The ramp assembly of claim 12, further comprising a hinge assembly extending between a portion of the brace assembly and the second end of the second platform at a support point for swinging movement of the second platform between a stored position, where the first and second platforms are stacked on each other, and an extended position, where the first end of the second platform is located on the ground surface.

14. The ramp assembly of claim 13, wherein the brace assembly includes a retractable first support assembly positioned adjacent the support point, the retractable first support assembly selectively deployable into an extended position, wherein the retractable first support assembly is positioned for supporting engagement with the ramp substantially near the support point.

15. The ramp assembly of claim 14, further comprising a retractable second support assembly positioned substantially near the side door, the retractable second support being reciprocally coupled to the trailer for movement between an extended position, wherein the retractable second support assembly is positioned for supporting engagement with the second end of the first platform, and a retracted positioned.

16. The ramp assembly of claim 15, wherein the retractable second support assembly includes a stationary support member fixed to a portion of the trailer and an arm telescopically received within the stationary support member, the arm being selectively deployable between extended position, where the arm engages and supports the second end of the first platform, and a retracted position.

17. The ramp assembly of claim 16, wherein when the arm is in the extended position, at least a portion of loads associated with the first platform is transferred to the stationary support member.

18. A ramp assembly for a trailer, the trailer having a floor assembly including an upper surface, a lower surface, and a length, the trailer further including first and second sidewalls extending from the floor assembly and a side door located in at least one of the first and second sidewalls, the ramp assembly comprising:
   a ramp coupled to the lower surface of the trailer, the ramp including first and second platforms each having first and second ends longitudinally spaced by a walking section having a length;
   a brace assembly configured to support the ramp thereon and extending between the lower surface of the floor assembly and the ramp, the brace assembly being movably coupled to the floor assembly for reciprocating movement of the ramp between a stowed position aft of the side door, where the ramp is stored underneath the floor assembly, and a deployed position, where the ramp extends alongside the trailer from a ground surface toward the side door along an axis substantially parallel to the length of the floor assembly to permit access to the side door of the trailer; and
   a hinge assembly extending between a portion of the brace assembly and the second end of the second platform at a support point for swinging movement of the second platform between a stored position, where the first and second platforms are stacked on each other, and an extended position, where the first end of the second platform is located on the ground surface.

19. The ramp assembly of claim 18, further comprising a locking device coupled to the ramp, the locking device being selectively deployable between a locked position, where a portion of the locking device prevents the ramp from moving from the stowed position to the deployed position, and an unlocked position.

20. The ramp assembly of claim 18, wherein a portion of the brace assembly is mounted to the lower surface of the trailer by a guide assembly for reciprocating movement of the ramp between the stowed and deployed positions.

21. The ramp assembly of claim 20, wherein the guide assembly includes a roller assembly to assist in the reciprocating movement of the ramp.

22. The ramp assembly of claim 21, wherein the brace assembly includes a retractable first support assembly positioned adjacent the support point, the retractable first support assembly selectively deployable into an extended position, wherein the retractable first support assembly is positioned for supporting engagement with the ramp substantially near the support point.

23. The ramp assembly of claim 22, further comprising a retractable second support assembly positioned substantially near the side door, the retractable second support assembly being reciprocally coupled to the trailer for movement between an extended position, wherein the retractable second support assembly is positioned for supporting engagement with the second end of the first platform, and a retracted positioned.

24. The ramp assembly of claim 23, wherein the retractable second support assembly includes a stationary support member fixed to a portion of the trailer and an arm telescopically received within the stationary support member, the arm being selectively deployable between extended position, where the arm engages and supports the second end of the first platform, and a retracted position.

25. The ramp assembly of claim 24, wherein when the arm is in the extended position, at least a portion of loads associated with the first platform is transferred to the stationary support member.

26. A ramp assembly for a trailer, the trailer having a floor assembly including an upper surface, a lower surface, and a length, the trailer further including first and second sidewalls extending from the floor assembly and a side door located in at least one of the first and second sidewalls, the ramp assembly comprising:

a ramp having a substantially planar surface and upstanding sidewalls, the ramp being configured to be stowed in a stowed position aft of the side door and underneath the lower surface of the floor assembly, the ramp being further configured to slidably extend to a deployed position where the ramp extends alongside the trailer from a ground surface toward the side door along an axis substantially parallel to the length of the floor assembly to permit access to the side door of the trailer; and a bracket assembly mounted beneath the upper surface of the floor assembly, the bracket assembly being configured to slidably support the ramp thereon, the bracket assembly extending between the ramp and the lower surface of the floor assembly.

27. The ramp assembly of claim 26, wherein a portion of the bracket assembly is mounted to the lower surface of the floor assembly by a guide assembly for reciprocating movement of the ramp between the stowed and deployed positions.

28. The ramp assembly of claim 27, wherein the guide assembly includes a roller assembly to assist in the reciprocating movement of the ramp.

29. The ramp assembly of claim 27, further comprising a lock mechanism fastened to the bracket assembly for selectively locking the ramp in the stowed position.

30. The ramp assembly of claim 29, wherein the ramp further includes:

first and second platforms each having first and second ends longitudinally spaced by a walking section having a length; and a hinge assembly extending between a portion of the bracket assembly and the second end of the second platform at a support point for swinging movement of the second platform between a stored position, where the first and second platforms are stacked on each other, and an extended position, where the first end of the second platform is located on the ground surface.

31. The ramp assembly of claim 30, wherein the bracket assembly includes a retractable first support assembly positioned adjacent the support point, the retractable first support assembly selectively deployable into an extended position, wherein the retractable first support assembly is positioned for supporting engagement with the ramp substantially near the support point.

32. The ramp assembly of claim 31, further comprising a retractable second support assembly positioned substantially near the side door, the retractable second support assembly being reciprocally coupled to the delivery vehicle for movement between an extended position, wherein the retractable second support assembly is positioned for supporting engagement with the second end of the first platform, and a retracted positioned.

33. The ramp assembly of claim 32, wherein the retractable second support assembly includes a stationary support member fixed to a portion of the delivery vehicle and an arm telescopically received within the stationary support member, the arm being selectively deployable between an extended position, where the arm engages and supports the second end of the first platform, and a retracted position.

34. The ramp assembly of claim 33, wherein when the arm is in the extended position, at least a portion of loads associated with the first platform is transferred to the stationary support member.

* * * * *